(12) United States Patent
Marr et al.

(10) Patent No.: US 9,543,662 B2
(45) Date of Patent: Jan. 10, 2017

(54) ELECTRONIC ROTMAN LENS

(71) Applicant: Raytheon Company, Waltham, MA (US)

(72) Inventors: Harry B. Marr, Manhattan Beach, CA (US); Walter B. Schulte, Jr., Huntington Beach, CA (US); John P. Gianvittorio, Venice, CA (US)

(73) Assignee: RAYTHEON COMPANY, Waltham, MA (US)

( * ) Notice: Subject to any disclaimer, the term of this patent is extended or adjusted under 35 U.S.C. 154(b) by 483 days.

(21) Appl. No.: 14/199,126

(22) Filed: Mar. 6, 2014

(65) Prior Publication Data

US 2016/0248172 A1    Aug. 25, 2016

(51) Int. Cl.

| | | |
|---|---|---|
| *G01S 7/03* | (2006.01) | |
| *G01S 13/44* | (2006.01) | |
| *H01Q 25/00* | (2006.01) | |
| *H01Q 3/24* | (2006.01) | |
| *H01Q 3/26* | (2006.01) | |
| *H04B 7/06* | (2006.01) | |

(Continued)

(52) U.S. Cl.
CPC ............ *H01Q 25/008* (2013.01); *G01S 7/03* (2013.01); *G01S 7/38* (2013.01); *H01Q 3/2676* (2013.01); *H01Q 15/02* (2013.01); *G01S 13/4409* (2013.01); *H04B 7/0671* (2013.01); *H04B 7/0894* (2013.01)

(58) Field of Classification Search
CPC ...... G01S 7/03; G01S 13/4409; H01Q 25/008; H01Q 25/007; H01Q 3/24; H01Q 3/26; H01Q 3/2605; H01Q 3/245; H01Q 3/2664; H01Q 3/2658; H01Q 3/2676; H01Q 15/02; H04B 7/0671; H04B 7/0617; H04B 7/0864
USPC ... 342/13, 175, 195, 196; 343/753, 754, 777
See application file for complete search history.

(56) References Cited

U.S. PATENT DOCUMENTS 4,489,325 A * 12/1984 Bauck ............... H01Q 3/38
                                                         342/374
4,736,463 A *  4/1988 Chavez .............. H01Q 3/34
                                                         342/367

(Continued)

FOREIGN PATENT DOCUMENTS

| EP | 0313623 A1 | 5/1989 |
|---|---|---|
| EP | 0793291 B1 | 5/1989 |

(Continued)

OTHER PUBLICATIONS

International Search Report and Written Opinion; International Application No. PCT/US2015/017013; International Filing Date: Feb. 23, 2015; Date of Mailing: Jun. 8, 2015; 11 pages.

(Continued)

*Primary Examiner* — Peter Bythrow
(74) *Attorney, Agent, or Firm* — Cantor Colburn LLP (57) ABSTRACT

Embodiments are directed to operating an analog signal processing circuit to emulate a Rotman lens. The analog signal processing circuit applies a plurality of time delays to a plurality of signals associated with a plurality of beam ports. The analog signal processing circuit forms a plurality of output beams for transmission by a plurality of array ports included in an array based on the time delayed signals by summing the time delayed signals. The time delays are based on a direction of transmission of the output beams.

19 Claims, 5 Drawing Sheets

(51) Int. Cl.
*H04B 7/08* (2006.01)
*G01S 7/38* (2006.01)
*H01Q 15/02* (2006.01)

(56) References Cited

U.S. PATENT DOCUMENTS

| | | | |
|---|---|---|---|
| 5,495,258 A * | 2/1996 | Muhlhauser | H01Q 3/40 343/753 |
| 5,677,697 A | 10/1997 | Lee et al. | |
| 5,812,089 A * | 9/1998 | Locke | H01Q 3/2605 342/371 |
| 6,348,890 B1 * | 2/2002 | Stephens | H01Q 3/2676 342/375 |
| 6,515,622 B1 * | 2/2003 | Izadpanah | H01Q 21/0006 342/368 |
| 6,677,899 B1 | 1/2004 | Lee et al. | |
| 7,605,768 B2 * | 10/2009 | Ebling | H01Q 1/3233 343/700 MS |
| 7,898,480 B2 * | 3/2011 | Ebling | G01S 13/931 343/700 MS |
| 8,811,511 B2 * | 8/2014 | Sayeed | H01Q 15/0006 343/755 |
| 9,215,622 B1 * | 12/2015 | Kinamon | H04B 7/0857 |
| 2007/0135168 A1 * | 6/2007 | Liu | H01Q 3/40 455/562.1 |
| 2009/0270051 A1 * | 10/2009 | Choi | H04B 7/0682 455/101 |
| 2010/0259446 A1 * | 10/2010 | Corman | H01Q 3/26 342/373 |
| 2010/0277371 A1 * | 11/2010 | Markus | G01S 7/032 342/375 |
| 2013/0027240 A1 * | 1/2013 | Chowdhury | G01S 7/032 342/94 |
| 2014/0029461 A1 | 1/2014 | Kinamon et al. | |

FOREIGN PATENT DOCUMENTS

| | | |
|---|---|---|
| EP | 0427470 B1 | 9/1996 |
| EP | 0963006 B1 | 3/2006 |
| EP | 1831958 B1 | 9/2010 |
| WO | 8809066 A1 | 11/1988 |
| WO | 2008098093 A2 | 8/2008 |

OTHER PUBLICATIONS

Liang et al., "Microwave and Millimeter Wave Beam Steering/Shaping Phased Antenna Arrays and Applications", University of California at Davis, Department of Electrical and Computer Engineering, 1997, 13 pages.

Tanaka et al., "Digital signal processor for digital multi-beam forming antenna in mobile communication", Vehicular Technology Conference, 1994 IEEE 44th Stockholm, Sweden, Jun. 8-10, 1994, pp. 1507-1511.

Lambrecht, Andreas, Stefan Beer, and Thomas Zwick. "True-time-delay beamforming with a Rotman-lens for ultrawideband antenna systems." Antennas and Propagation, IEEE Transactions on 58.10 (2010): 3189-3195.

Sadhu, Bodhisatwa, et al., "Analysis and Design of a 5 GS/s Analog Charge-Domain FFT for an SDR Front-End in 65 nm CMOS", IEEE Journal of Solid-State Circuits, vol. 48, No. 5, May 2013, pp. 1199-1211.

* cited by examiner

ELECTRONIC ROTMAN LENS

BACKGROUND

The present disclosure relates to electronics, and more specifically, to antenna systems such as those used in electronic warfare (EW).

Today's EW environment requires EW antenna systems to radiate simultaneous pulses in different directions 30% to 100% of the time. There are two basic EW antenna systems in current use: active electronically scanned array (AESA) systems and Rotman lens systems.

The AESA systems cannot simultaneously radiate multiple beams in multiple, different directions without splitting the main array into a corresponding set of multiple sub-arrays. Splitting the main array into sub-arrays broadens the beam pattern of each sub-array, thereby reducing the gain and hence the effective radiated power (ERP). Thus, the ERP hitting a target is reduced by both the loss of gain and the split of power.

Rotman lens systems can radiate multiple beams in multiple directions using the full aperture of the array for each beam. Thus, the ERP hitting a target is reduced only by the split of power. However, the size of a Rotman lens system imposes additional constraints. Rotman lens systems tend to be large, limiting their use in two-dimensional and polarization diverse applications.

SUMMARY

According to one embodiment, a method is directed to operating an analog signal processing circuit to emulate a Rotman lens. The method comprises: applying, by the analog signal processing circuit, a plurality of time delays to a plurality of signals associated with a plurality of beam ports, and forming, by the analog signal processing circuit, a plurality of output beams for transmission by a plurality of array ports included in an array based on the time delayed signals by summing the time delayed signals, wherein the time delays are based on a direction of transmission of the output beams.

According to another embodiment, a system comprises: a plurality of beam ports, an array comprising a plurality of array ports, and an analog signal processing circuit configured to form an output beam for transmission by the array ports based on applying a plurality of time delays to a signal from at least one of the beam ports, where the time delays are selected in accordance with a selected direction for transmission wherein the array is configured to simultaneously transmit multiple output beams by summing time delayed signals from multiple beam ports at each array port.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described that utilize analog signal processing to reduce the size, weight, and power of a system, such as an electronic warfare (EW) system. The size of a given implementation may be approximately one-one-hundredth (0.01) of a conventional Rotman lens and, as such, may be used in both azimuth and elevation for dual polarization. The analog signal processing may be orders of magnitude faster than beam steering schemes used on conventional active electronically scanned array (AESA) systems and may be modular and expandable.

In some embodiments, a first level of electronic Rotman lenses feed one or more additional levels so the resultant, multiple-level feed illuminates a large array. The lenses or levels are arranged so that a beam can continuously scan across an entire field of view (FoV).

In some embodiments, analog signal processing circuits (e.g., integrated circuits (ICs)) enable a matrix-based time delay computation at radio frequency (RF). These circuits enable the generation of an electronic Rotman lens in which array ports are fed into and out of the circuits. The circuits form beams in multiple directions simultaneously using some or all array ports that are frequency independent up to an operational band. In this manner, an effective Rotman lens is provided which is many orders of magnitude smaller and more power efficient than an optical/physical-based Rotman lens or optical lens.

In some embodiments, circuits are used to enable beam forming in an analog sample space. The beam forming computations are space-time beam forming capable and multiple time samples can be used for a complex weighting to beam steer. The circuits are wideband and frequency independent. The circuits operate at radio frequency (RF) up to 4 GHz in fabricated ICs and up to the X-band in simulation at current nodes. The RF frequencies that are used in connection with the circuits may scale with Moore's law, enabling enhanced processing capabilities in the same circuit real estate or space over time.

A Rotman lens can be modeled as a matrix multiplication of the form:

$$\begin{bmatrix} A_1 \\ A_2 \\ \vdots \\ A_m \end{bmatrix} = \begin{bmatrix} \tau_{1,1} & \tau_{1,2} & \cdots & \tau_{1,n} \\ \tau_{2,1} & \tau_{2,2} & \cdots & \tau_{2,n} \\ \vdots & & & \vdots \\ \tau_{m,1} & \tau_{m,2} & \cdots & \tau_{m,n} \end{bmatrix} \begin{bmatrix} B_1 \\ B_2 \\ \vdots \\ B_n \end{bmatrix},$$

where $A_1$; $A_2$; ... $A_m$ represent inputs to a count of 'm' radiators in an array (e.g., an antenna array). $B_1$; $B_2$; ... $B_n$ represent a count of 'n' beams that serve as input or source beams for beam forming operations. The matrix $\tau_{1,1}$; $\tau_{1,2}$; ... $\tau_{1,n}$; $\tau_{2,1}$; $\tau_{2,2}$; ... $\tau_{2,n}$; ... $\tau_{m,1}$; $\tau_{m,2}$; ... $\tau_{m,n}$ represents parameters used to facilitate a mapping of the input beams 'B' to the radiators 'A' and is used to beam form or beam shape the input beams 'B'.

The count 'm' of radiators 'A' is selected based on the resolution or sharpness required in a given application environment. The larger the value of 'm', the sharper the beams that are provided as more constructive interference is obtained. The count 'n' of beams 'B' is selected based on a number of objects or threats that are of potential interest in the application environment.

Figure 1:
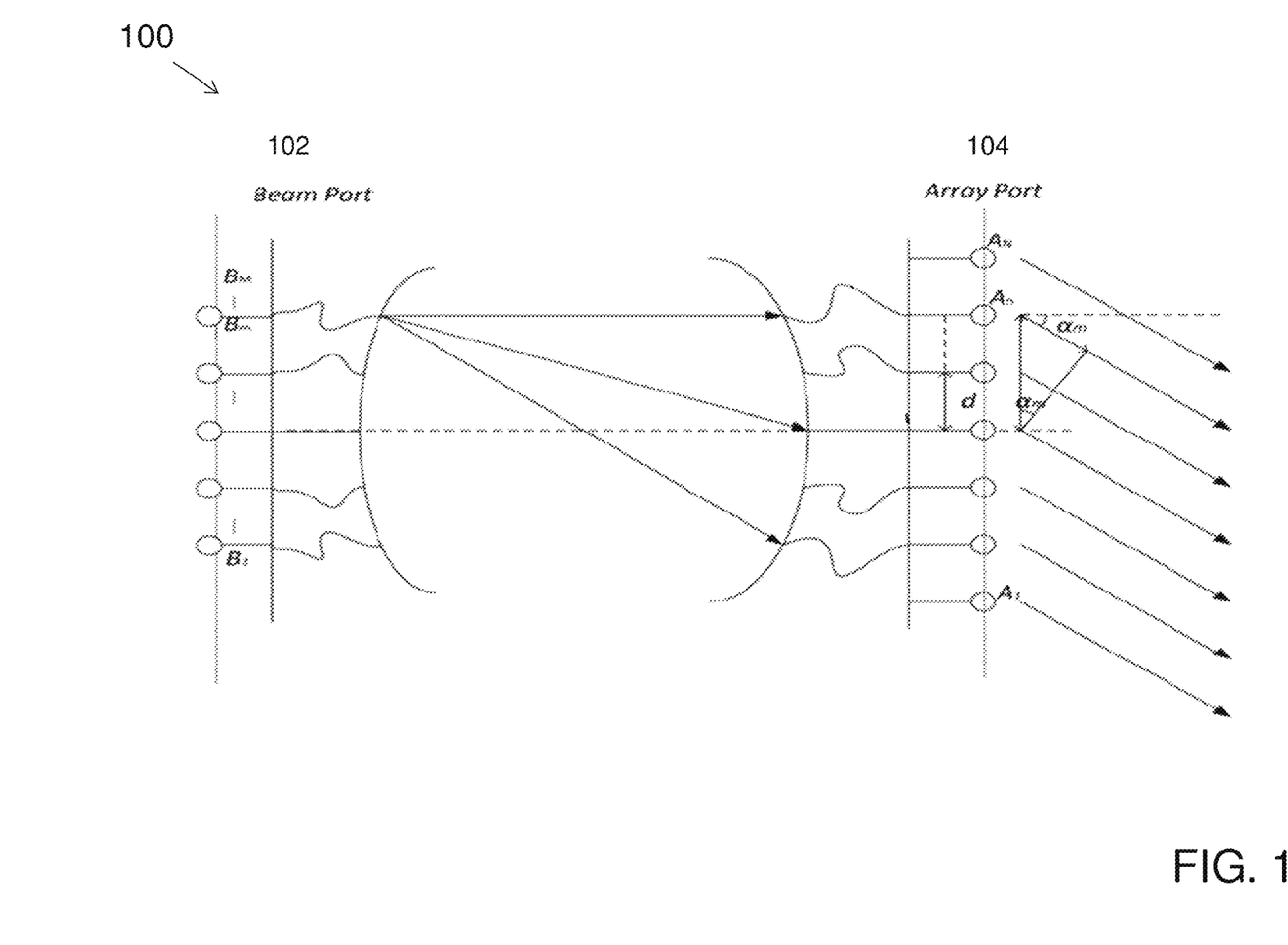
FIG. 1 is a block diagram of an exemplary system.

Referring to FIG. 1, a system 100 is shown. The system 100 may be used to illustrate the principle of matrix multiplication described above. In particular, beams 'B' associated with a beam port 102 are conveyed to an array port 104 comprising arrays or array elements 'A'. A given input beam (e.g., $B_1$) experiences different characteristics (e.g., path length) in reaching a first array (e.g., $A_1$) relative to a second array (e.g., $A_2$). These different characteristics (e.g., '$\tau$') are used or exploited to establish a direction of a beam (ultimately) emerging from the arrays. The different characteristics are independent of frequency of operation (at least to a first order approximation), thus allowing for wideband operation. In FIG. 1, alpha '$\alpha$' represents the steer of the pattern that generated from the $m^{th}$ beam port and 'd' represents a separation distance between elements.

Figure 2A:
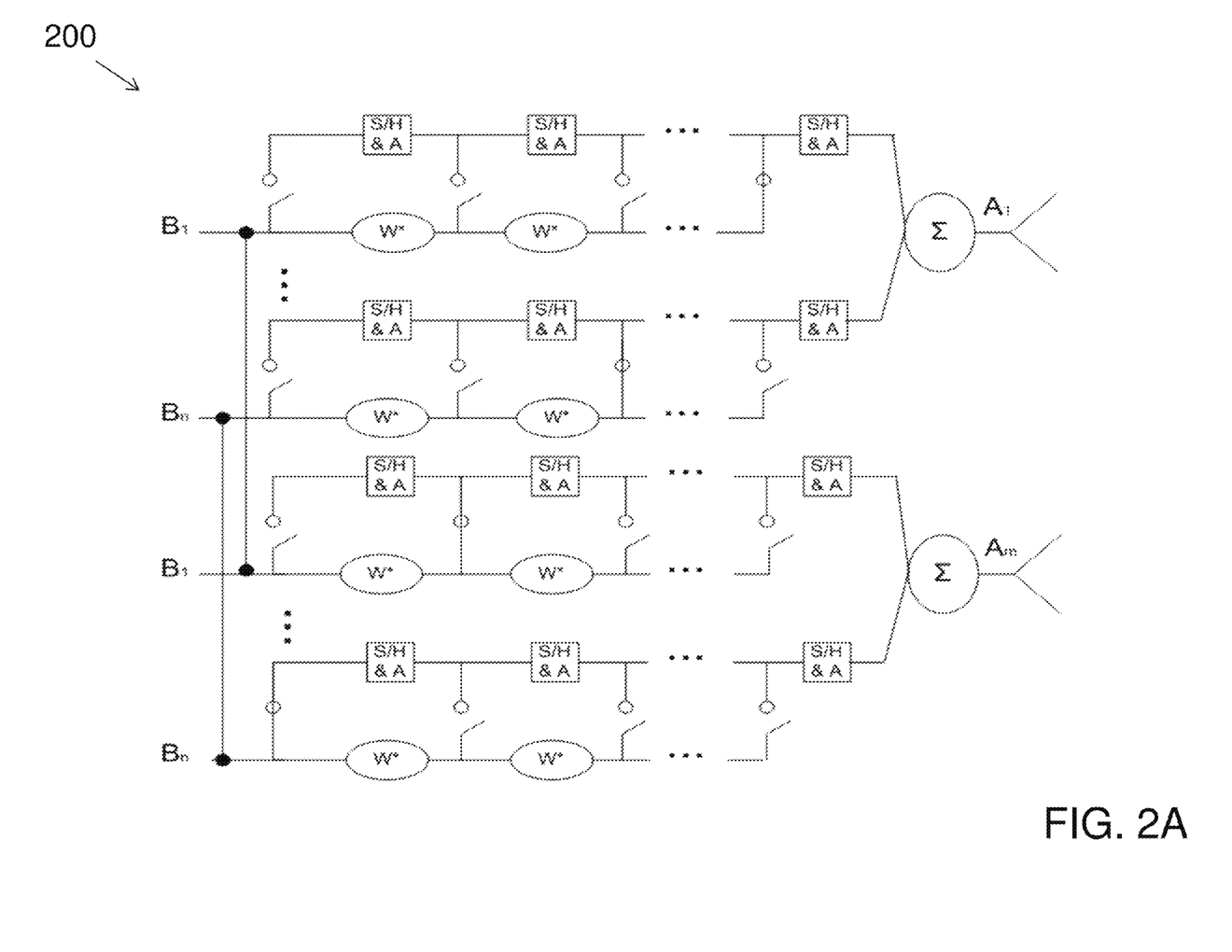
FIG. 2A illustrates a time domain based beam forming system.

Turning to FIG. 2A, a system 200 is shown. The system 200 may be implemented as part of a signal processor, such as an analog signal processor. The system 200 emulates a Rotman lens by performing matrix multiplication in the time domain. The system 200 may perform such multiplication in real-time or substantially in real-time.

The outputs of the system 200 correspond to a plurality of radiator arrays or array elements $A_1$; $A_2$; ... $A_m$. Each of the outputs $A_1$; $A_2$; ... $A_m$ is driven as a function of input beams $B_1$; $B_2$; ... $B_n$. In this respect, the contribution of each input beam 'B' may be summed to provide a given output 'A'.

Sample-and-hold (S/H) circuits, potentially in combination with amplifiers (S/H & A) map the input beams 'B' to the output arrays 'A'. The S/H or S/H & A circuits convert continuous signals to discrete time signals or discrete time samples. A chain or series of switched S/H or S/H & A circuits are used as shown in the embodiment of FIG. 2A to implement true time delay, allowing for multiple simultaneous beams to be provided over a wide band. In an embodiment, the number of S/H or S/H & A circuits switched into the signal path is selected based on the amount of true time delay needed to correctly form the beam. As an example, if the S/H or S/H & A circuits are clocked at 1 ns and it is desired to create 10 ns worth of true time delay, ten S/H or S/H & A circuits may be included or switched.

The system 200 includes weights (W*). The weights W* are applied for narrow band and adaptive solutions. For example, the weights W* are used for purposes of space-time adaptive beam forming.

The weights W* may be implemented in one or more forms. For example, the weights W* may be implemented using an op-amp circuit, a floating-gate transistor circuit, etc. In some embodiments, any technique may be used to hold a constant charge on the gate of a transistor, such as a digital to analog converter (DAC) programmed to have a constant output wired to a gate of a transistor.

Figure 2B:
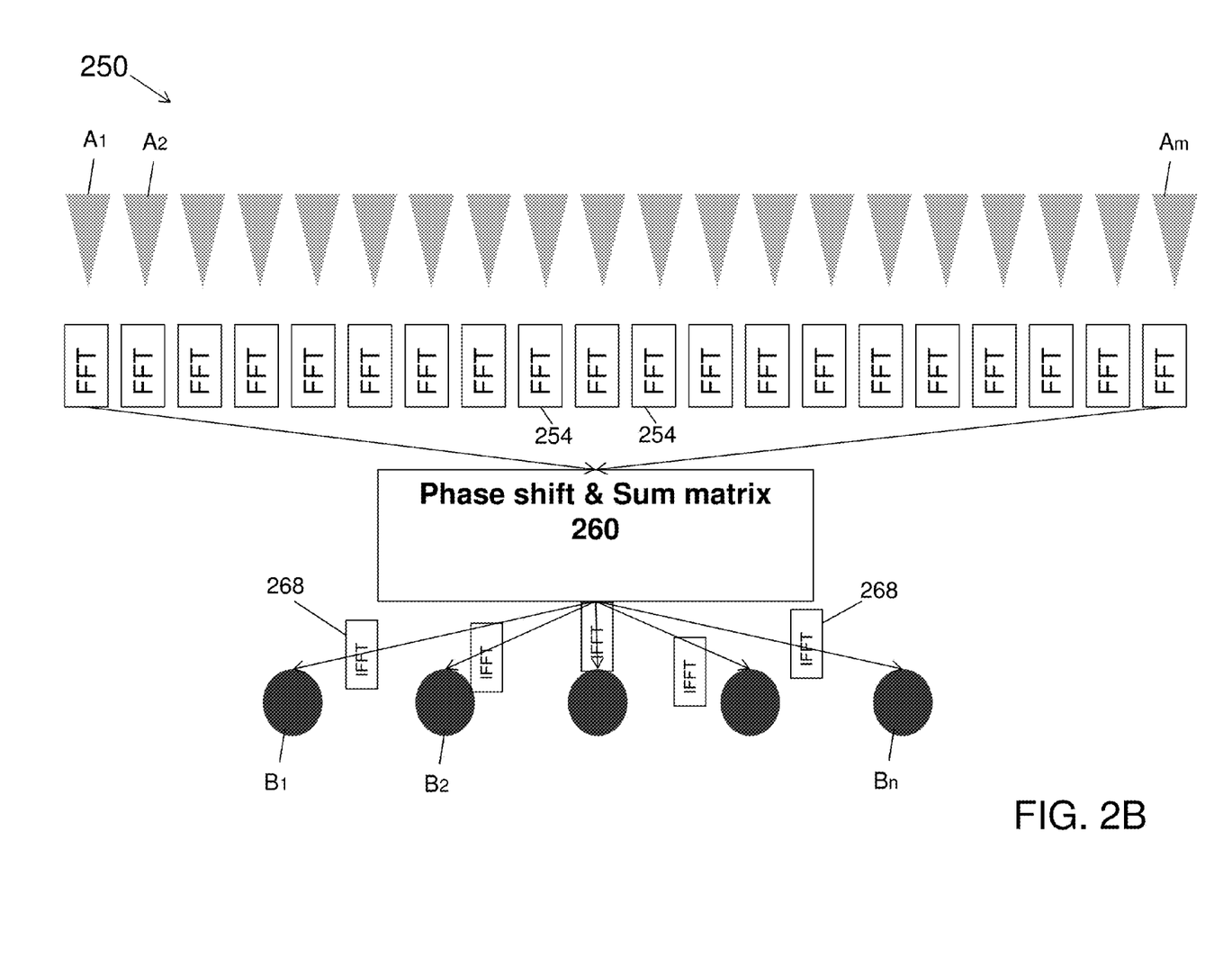
FIG. 2B illustrates a frequency domain based beam forming system.

Referring to FIG. 2B, a system 250 is shown. The system 250 may be implemented as part of a signal processor, such as an analog signal processor. The system 250 emulates Rotman lens beam steering based on frequency domain techniques as described further below.

The system 250 includes a plurality of radiator arrays or array elements $A_1$; $A_2$; ... $A_m$. The array elements $A_1$; $A_2$; ... $A_m$ are arranged to receive incoming signals. An analog fast Fourier transform (FFT) algorithm 254 is applied to the incoming signals which serve to divide the signal from each of the array ports $A_1$; $A_2$; ... $A_m$ into frequency components or bins. Each array port's frequency binned signals are summed and a phase shift or frequency-dependent weighting is applied to each frequency bin in block 260 for each beam $B_1$; $B_2$; ... $B_n$. An inverse fast Fourier transform (IFFT) algorithm 268 is performed on each beam $B_1$; $B_2$; ... $B_n$.

The system 250 is shown and described above in connection with the receipt of signals. One skilled in the art would appreciate that an inverse of the operations described above could be performed to support signal transmission.

Figure 3:
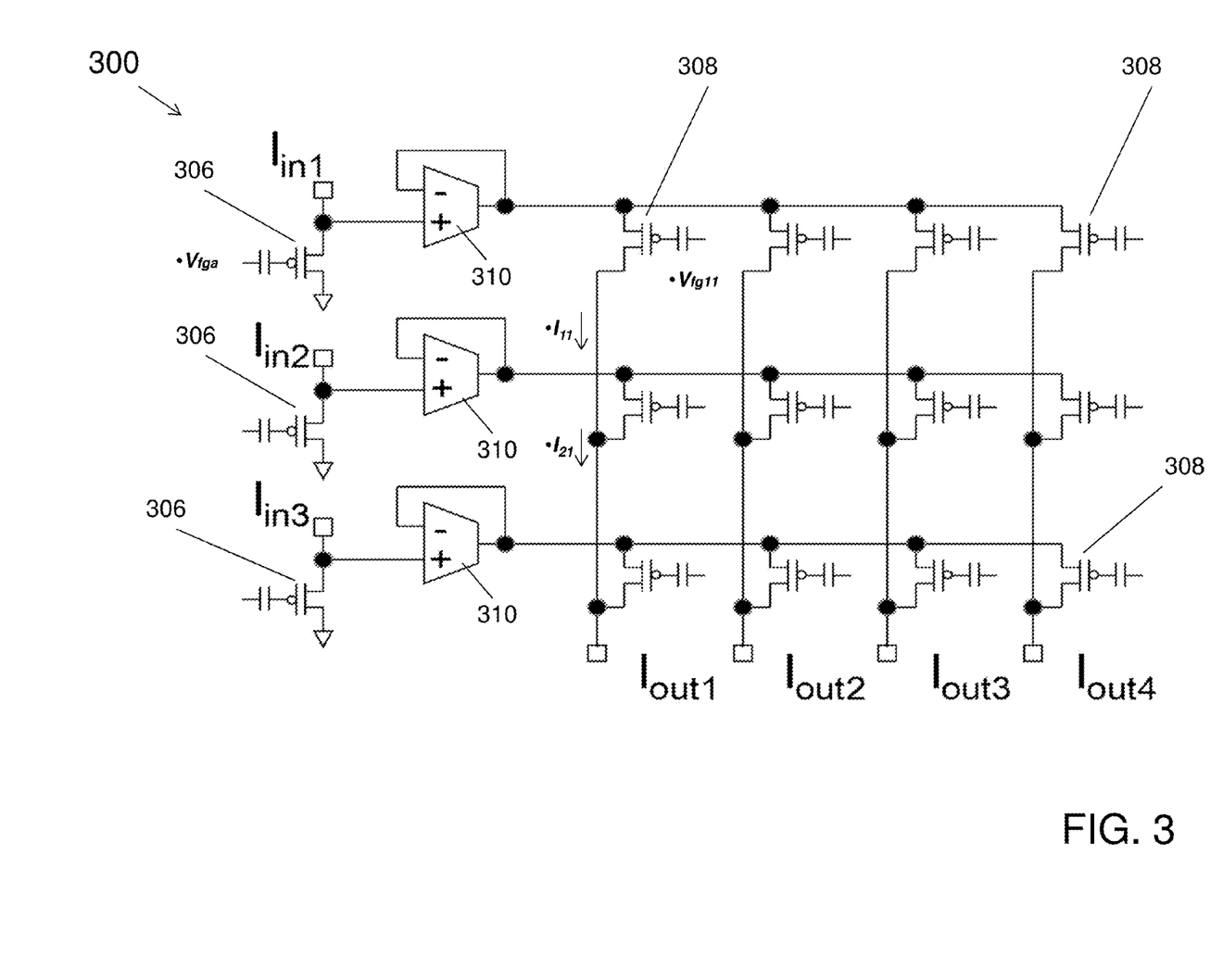
FIG. 3 illustrates a weighting circuit.

Referring to FIG. 3, a weighting circuit 300 in accordance with one or more embodiments is shown. In particular, the weighting circuit 300 may be used to implement one or more weights, such as the weights W* in connection with FIG. 2A.

T weighting circuit 300 includes a number of input transistors 306 (e.g., floating gate transistors) associated with a number of input currents (e.g., $I_{in1}$, $I_{in2}$, $I_{in3}$). The weighting circuit 300 includes a number of output transistors 308 (e.g., floating gate transistors) associated with a number of output currents (e.g., $I_{out1}$, $I_{out2}$, $I_{out3}$, $I_{out4}$). The weighting circuit 300 includes a number of followers or comparators 310 that couple the input transistors 306 and the output transistors 308.

The circuit 300 is configured to generate each of the output currents as a weighted summation of the input currents. For example, the output currents are calculated as:

$$\begin{bmatrix} I_{out1} \\ I_{out2} \\ I_{out3} \\ I_{out4} \end{bmatrix} = \begin{bmatrix} w_{11} & w_{12} & w_{13} \\ w_{21} & w_{22} & w_{23} \\ w_{31} & w_{32} & w_{33} \\ w_{41} & w_{42} & w_{43} \end{bmatrix} \begin{bmatrix} I_{in1} \\ I_{in2} \\ I_{in3} \end{bmatrix},$$

where the middle matrix $[w_{11}, w_{12}, ... w_{43}]$ corresponds to weights or weighting factors.

Each of the weights $[w_{11}, w_{12}, ... w_{43}]$ is expressed as a ratio of the exponential of a gate voltage on an output transistor 308 divided by the exponential of a gate voltage on an input transistor 306. Taking $w_{11}$ as an example, $w_{11}$ is expressed as:

$e^{V_{fg11}}/e^{V_{fga}}$, wherein the voltages $V_{fg11}$ and $V_{fga}$ are located as shown in FIG. 3. Similar examples may be constructed for the other weights $w_{12}$, ... $w_{43}$.

The weighting circuit 300 is shown as being implemented in terms of a current domain technique. Other types of domains or techniques may be used to implement weighting. For example, a charge domain circuit or technique known to one of skill in the art may be used in some embodiments.

Figure 4:
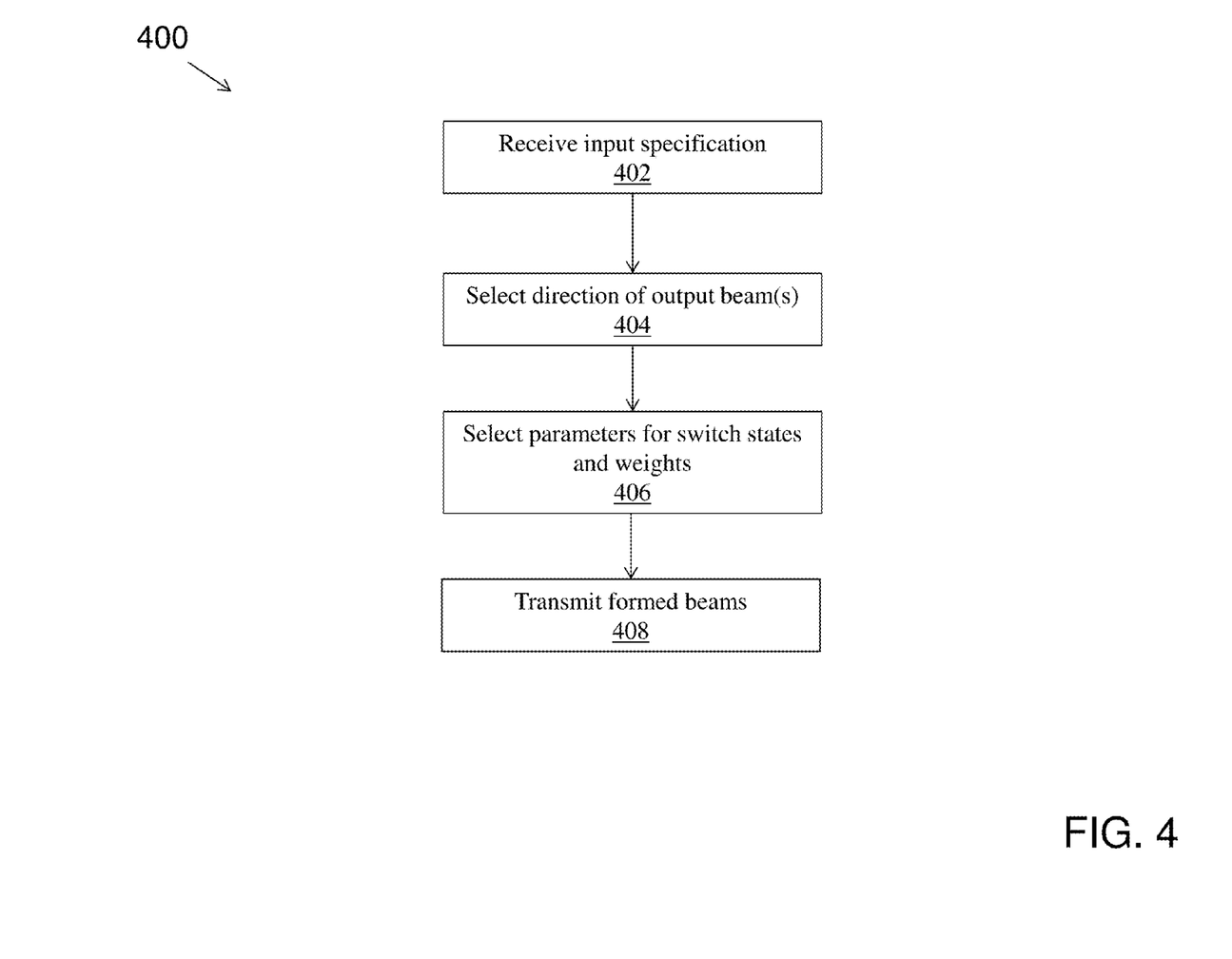
FIG. 4 illustrates a flow chart of an exemplary method.

Referring now to FIG. 4, a flow chart of an exemplary method 400 is shown. The method 400 may execute in accordance with one or more devices, components, or systems, such as those described herein. The method 400 is used to implement matrix operations (e.g., multiplication and summation) to form one or more beams.

In block 402, an input specification is received. The input specification may include requirements, such as a number 'n' of input beams 'B' that are needed and a number 'm' of array or array elements 'A' that are needed.

In block 404, a direction of output beams is selected. The direction(s) is/are selected based on an identification of a particular target or a scene or geographical location that is of potential interest.

In block 406, one or more parameters is selected for forming output beams in accordance with the criteria established in blocks 402 and 404. For example, as part of block 406 a state (e.g., open or closed) associated with one or more switches coupled to S/H or S/H & A circuits is selected. Weights (W*) associated with the S/H or S/H & A circuits may be selected as part of block 406.

In block 408, the output beams are transmitted or radiated by the arrays or array elements.

Embodiments of the disclosure enable beam forming for transmit and receive functionalities or capabilities. In some embodiments, multiple beams are generated in multiple directions simultaneously, where the elements or components used to provide such beams may be frequency independent. In some embodiments, beams are transmitted and received simultaneously using an entire array in dual polarization to increase effective radiated power (ERP) matched to a target polarization. The use of multiple simultaneous beams enables automatic power management to be provided per beam since each beam can use the entire array. The beams are formed in analog at a front end at high frequencies up to the Ku band. The beam forming may be performed in accordance with a low size, weight, power, and cost (SWAP-C) configuration that doesn't significantly scale with the number of beams and the number of array elements or components.

In an embodiment, one or more output beams are formed for transmission by taking a given signal and creating a unique time delay per array element (port) using switched capacitor circuits. A set of unique time delays mapped to the set of array elements (ports) may be associated with a single transmit (output beam). So a set of time delays is used to form a beam. Multiple simultaneous beams are formed by applying multiple sets of time delays mapped to the set of array ports and summing all these time delayed signals at each array port.

In an embodiment, signals coming from a set of array ports may be received and a time delay may be applied using switched capacitor circuits. In connection with this embodiment, a set is defined as a time delay applied to each array port signal. This set of time delays applied to the set of array ports enables the formation of a beam on receive (input beam). Multiple simultaneous input beams are created or generated by applying unique sets of time delays to the same set of array ports.

In some embodiments various functions or acts may take place at a given location and/or in connection with the operation of one or more apparatuses, systems, or devices. For example, a portion of a given function or act may be performed at a first device or location, and the remainder of the function or act may be performed at one or more additional devices or locations.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for operating an analog signal processing circuit to emulate a Rotman lens, the method comprising:
    applying, by the analog signal processing circuit, a plurality of time delays to a plurality of signals associated with a plurality of beam ports; and
    forming, by the analog signal processing circuit, a plurality of output beams for transmission by a plurality of array ports included in an array based on the time delayed signals by summing the time delayed signals, wherein the time delays are based on a direction of transmission of the output beams.

2. The method of claim 1, wherein the analog signal processing circuit comprises switched sample-and-hold circuits, the method further comprising:
    coupling, by a first series of the sample-and-hold circuits, a first beam port included in the plurality of beam ports to a first array port included in the array.

3. The method of claim 2, further comprising:
    coupling, by a second series of the sample-and-hold circuits, a second beam port included in the plurality of beam ports to the first array port; and
    summing an output of the first series of the sample-and-hold circuits with an output of the second series of the sample-and-hold circuits; and
    driving the first of the array port based on an output of the summation.

4. The method of claim 2, further comprising:
    applying independent weights to each of the sample-and-hold circuits included in the first series.

5. The method of claim 4, further comprising:
    using a floating-gate transistor circuit or a digital to analog converter (DAC) programmed to have a constant output wired to a gate of a transistor to implement the weights.

6. The method of claim 1, further comprising:
    applying, by the analog signal processing circuit, a fast Fourier transform (FFT) algorithm and an inverse FFT algorithm in forming the output beams.

7. The method of claim 6, further comprising:
    applying, by the analog signal processing circuit, a phase shift and summation matrix to an output of the FFT algorithm.

8. The method of claim 1, further comprising:
    receiving a signal via the array ports;
    applying a fast Fourier transform (FFT) algorithm to the signal from each of the array ports to divide the signal from each of the array ports into frequency bins;
    summing each array port's frequency binned signals and applying a phase shift to each frequency bin for each input beam; and
    performing an inverse FFT algorithm on each input beam.

9. The method of claim 8, further comprising:
applying a FFT algorithm to a second signal to generate a plurality of beams;
applying a phase shift to the generated beams;
applying an inverse FFT algorithm to the phase shifted beams; and
transmitting one or more outputs of the inverse FFT algorithm via the array ports.

10. A system for emulating a Rotman lens, comprising:
a plurality of beam ports;
an array comprising a plurality of array ports; and
an analog signal processing circuit configured to form an output beam for transmission by the array ports based on applying a plurality of time delays to a signal from at least one of the beam ports, where the time delays are selected in accordance with a selected direction for transmission wherein the array is configured to simultaneously transmit multiple output beams by summing time delayed signals from multiple beam ports at each array port.

11. The system of claim 10, wherein the analog signal processing circuit is configured to form input beams based on the plurality of time delays applied to the array ports and summed at a beam port, and wherein the array is configured such that a plurality of time delays are applied to each array element to form multiple input beams simultaneously where the true time delays are selected in accordance with a selected direction for reception.

12. The system of claim 10, wherein the analog signal processing circuit comprises switched sample-and-hold circuits.

13. The system of claim 12, wherein a first series of sample-and-hold circuits couples a first of the beam ports to a first of the array ports.

14. The system of claim 13, wherein a second series of sample-and-hold circuits couples a second of the beam ports to the first of the array ports, and wherein an output of the first series of sample-and-hold circuits is summed with an output of the second series of sample-and-hold circuits, and wherein an output of the summation drives the first of the array ports.

15. The system of claim 13, wherein independent weights are applied to each of the sample-and-hold circuits included in the first series.

16. The system of claim 15, wherein the weights are implemented using a floating-gate transistor circuit.

17. The system of claim 15, wherein the weights are implemented using at least one of a current domain circuit and a charge domain circuit.

18. The system of claim 10, wherein the analog signal processing circuit is configured to apply a fast Fourier transform (FFT) algorithm and an inverse FFT algorithm in forming the output beam, and wherein the analog signal processing circuit is configured to apply a phase shift and summation matrix to an output of the FFT algorithm.

19. The system of claim 10, wherein the array ports are configured to receive a signal, and wherein the analog signal processing circuit is configured to:
apply a fast Fourier transform (FFT) algorithm to the signal from each of the array ports to divide the signal from each of the array ports into frequency bins; and
sum each array port's frequency binned signals, apply a phase shift to each frequency bin, and perform an inverse FFT algorithm for each beam port.

* * * * *